(12) United States Patent
Akanuma et al.

(10) Patent No.: US 10,483,833 B2
(45) Date of Patent: Nov. 19, 2019

(54) VIBRATION MOTOR

(71) Applicant: Nidec Seimitsu Corporation, Ueda-shi, Nagano-ken (JP)

(72) Inventors: Tomohiro Akanuma, Ueda (JP); Mitsuru Oi, Ueda (JP)

(73) Assignee: NIDEC SEIMITSU CORPORATION, Nagano (JP)

( * ) Notice: Subject to any disclaimer, the term of this patent is extended or adjusted under 35 U.S.C. 154(b) by 134 days.

(21) Appl. No.: 15/874,912

(22) Filed: Jan. 19, 2018

(65) Prior Publication Data

US 2018/0219466 A1 Aug. 2, 2018

(30) Foreign Application Priority Data

Jan. 27, 2017 (JP) ................. 2017-013431

(51) Int. Cl.
*H02K 33/06* (2006.01)
*H02K 33/16* (2006.01)
*H02K 15/00* (2006.01)

(52) U.S. Cl.
CPC ............. *H02K 33/06* (2013.01); *H02K 33/16* (2013.01); *H02K 15/00* (2013.01)

(58) Field of Classification Search
CPC ........ H02K 33/00–33/18; H02K 15/00; H02K 41/0354; H02N 2/02
USPC ......................................... 310/15–39, 12.16
See application file for complete search history.

(56) References Cited

U.S. PATENT DOCUMENTS

| | | | |
|---|---|---|---|
| 9,024,489 B2 | 5/2015 | Akanuma et al. | |
| 2013/0229070 A1* | 9/2013 | Akanuma | H02K 33/00 310/25 |
| 2016/0254736 A1* | 9/2016 | Jin | H02K 33/16 310/25 |

FOREIGN PATENT DOCUMENTS

| | | |
|---|---|---|
| CN | 102820760 A | 12/2012 |
| JP | 2013-169544 A | 9/2013 |

* cited by examiner

*Primary Examiner* — Thomas Truong
(74) *Attorney, Agent, or Firm* — Keating & Bennett, LLP

(57) ABSTRACT

A first elastic member includes a first fastening portion, a second fastening portion, and a first coupling portion. A second elastic member includes a third fastening portion, a fourth fastening portion, and a second coupling portion. The first fastening portion, the second fastening portion, the third fastening portion, and the fourth fastening portion extend in a lateral direction. The first fastening portion and the second fastening portion face each other in a longitudinal direction, perpendicular to the lateral direction. The third fastening portion and the fourth fastening portion face each other in the longitudinal direction. The first coupling portion and the second coupling portion include plane portions extending in the longitudinal direction when a vibrating body has zero displacement. The first fastening portion to the fourth fastening portion extend in the lateral direction without being bent from coupled portions between themselves to a first curve to a fourth curve.

22 Claims, 12 Drawing Sheets

VIBRATION MOTOR

CROSS REFERENCE TO RELATED APPLICATIONS

This application claims the benefit of priority to Japanese Patent Application No. 2017-013431 filed on Jan. 27, 2017. The entire contents of this application are hereby incorporated herein by reference.

BACKGROUND OF THE INVENTION

1. Field of the Invention

The present invention relates to a vibration motor.

2. Description of the Related Art

A variety of devices including smartphones have included a vibration motor. Examples of a vibration motor include a so-called lateral linear vibration motor that includes a vibrating body that vibrates in the lateral direction. An example of such an existing vibration motor is disclosed in Chinese Patent Application Publication No. 102820760.

The vibration motor disclosed in Chinese Patent Application Publication No. 102820760 includes a vibrating body including a weight, and a pair of flat springs. The vibrating body vibrates in the lateral direction. The flat springs have a letter-V shape in a plan view and have the same shape. One of the flat springs is fastened to a first side, in the lateral direction, of one of side wall surfaces of the weight, the surfaces facing each other in a longitudinal direction, perpendicular to the lateral direction. The other flat spring is fastened on a second side, in the lateral direction, of the other side wall surface of the weight. Specifically, the fastened portions of the flat springs are diagonally located in a plan view.

Another example of an existing vibration motor is disclosed in Japanese Patent Application Publication No. 2013-169544. The vibration motor disclosed in Japanese Patent Application Publication No. 2013-169544 includes a casing, a vibrating body, and a pair of flat springs. Each flat spring has its first end portion in the longitudinal direction fixed to a side wall surface of the vibrating body, and has its second end portion in the longitudinal direction fixed to a peripheral wall surface of a casing. A connection portion at which each flat spring and the vibrating body are connected together and an attached portion at which each flat spring and the peripheral wall surface are attached together are respectively located, in a direction crossing the vibration direction of the vibrating body, on both sides with the vibrating body interposed therebetween. A middle portion of each flat spring between the connection portion and the attached portion is inclined so as to gradually come closer toward the peripheral wall surface away from the vibrating body, from the one side area toward the other side area in which the attached portion is located.

The vibration motor disclosed in Chinese Patent Application Publication No. 102820760, however, is disadvantageous in that the entirety of the vibration motor has a large dimension in the lateral direction to secure the opening of the V shape of each flat spring so as to allow for an amount for displacement when the vibrating body vibrates in the lateral direction.

Moreover, since the fastened portions of the flat springs and the weight are diagonally located in a plan view, the vibrating body is more likely to vibrate obliquely (diagonally) in a plan view. When the vibrating body vibrates obliquely, the weight may come into contact with the pair of side wall surfaces of the case facing each other in the longitudinal direction. To prevent the weight from coming into contact with the side wall surfaces, the weight needs to be spaced apart from the case, so that the vibration motor may have a large dimension in the longitudinal direction.

In the vibration motor according to Japanese Patent Application Publication No. 2013-169544, the middle portion of each flat spring is inclined, so that the vibration motor has a large dimension in the lateral direction. The attached portion extends, without being bent, in the lateral direction from a coupled portion at which it is coupled with a curve extending from the first end of the middle portion. On the other hand, the connection portion is coupled to a curve extending from the second end of the middle portion with two curves interposed therebetween. Thus, the vibrating body is more likely to vibrate obliquely in a plan view. The fastened portions in the connection portion and the attached portion do not face each other in the longitudinal direction, crossing the direction in which the vibrating body vibrates. Also from this respect, the vibrating body is more likely to vibrate obliquely in a plan view. When the vibrating body vibrates obliquely, the vibrating body may come into contact with the attached portion. Thus, each flat spring needs to have a large dimension in the longitudinal direction. Specifically, the vibration motor has a large dimension in the longitudinal direction.

SUMMARY OF THE INVENTION

A vibration motor according to an embodiment of the present application includes a stationary portion, a vibrating body, a first elastic member, and a second elastic member. The stationary portion includes a casing and a coil. The vibrating body includes a magnet and a weight. The vibrating body is supported to be capable of vibrating in a lateral direction relative to the stationary portion. The first elastic member has a plate shape. The first elastic member includes a first fastening portion, a second fastening portion, and a first coupling portion. The second elastic member has a plate shape. The second elastic member includes a third fastening portion, a fourth fastening portion, and a second coupling portion. The first coupling portion couples the first fastening portion to the second fastening portion. The second coupling portion couples the third fastening portion to the fourth fastening portion. The first fastening portion, the second fastening portion, the third fastening portion, and the fourth fastening portion extend in the lateral direction. The first fastening portion and the second fastening portion face each other in a longitudinal direction perpendicular to the lateral direction. The third fastening portion and the fourth fastening portion face each other in the longitudinal direction. The first coupling portion and the second coupling portion each include a plane portion extending in the longitudinal direction when the vibrating body has zero displacement. The weight includes a first side wall extending in the lateral direction, a second side wall extending in the longitudinal direction, and a third side wall extending in the longitudinal direction. The second side wall and the third side wall face each other in the lateral direction. The first fastening portion is fixed to a first side of the first side wall in the lateral direction. The third fastening portion is fixed to a second side of the first side wall in the lateral direction. The plane portion of the first coupling portion faces the second side wall in the lateral direction. The plane portion of the second coupling portion faces the third side wall in the lateral direction. The second fastening portion and the fourth fastening portion are fixed to an inner wall surface of the casing extending in the lateral direction. The first coupling portion further includes a first curve, which is bent to be oriented in the lateral direction from a first end of the plane portion, and a second curve, which is bent to be oriented in the lateral direction from a second end of the plane portion. The first fastening portion extends in the lateral direction without being bent at a coupled portion between the first fastening portion and the first curve. The second fastening portion extends in the lateral direction without being bent at a coupled portion between the second fastening portion and the second curve. The second coupling portion further includes a third curve, which is bent to be oriented in the lateral direction from the first end of the plane portion, and a fourth curve, which is bent to be oriented in the lateral direction from the second end of the plane portion. The third fastening portion extends in the lateral direction without being bent from a coupled portion between the third fastening portion and the third curve. The fourth fastening portion extends in the lateral direction without being bent from a coupled portion between the fourth fastening portion and the fourth curve.

A vibration motor according to an embodiment of the present application includes a stationary portion, a vibrating body, a first elastic member, and a second elastic member. The stationary portion includes a casing and a coil. The vibrating body includes a magnet and a weight, and is supported to be capable of vibrating in a lateral direction relative to the stationary portion. The first elastic member has a plate shape. The first elastic member includes a first fastening portion, a second fastening portion, and a first coupling portion. The second elastic member has a plate shape. The second elastic member includes a third fastening portion, a fourth fastening portion, and a second coupling portion. The first coupling portion couples the first fastening portion to the second fastening portion. The second coupling portion couples the third fastening portion to the fourth fastening portion. The first fastening portion, the second fastening portion, the third fastening portion, and the fourth fastening portion extend in the lateral direction. The first fastening portion and the second fastening portion face each other in a longitudinal direction perpendicular to the lateral direction. The third fastening portion and the fourth fastening portion face each other in the longitudinal direction. The first coupling portion and the second coupling portion each include a plane portion extending in the longitudinal direction when the vibrating body has zero displacement. The weight includes a first side wall extending in the lateral direction, a second side wall extending in the longitudinal direction, and a third side wall extending in the longitudinal direction. The second side wall and the third side wall face each other in the lateral direction. The first fastening portion is fixed to a first side of the first side wall in the lateral direction. The third fastening portion is fixed to a second side of the first side wall in the lateral direction. The plane portion of the first coupling portion faces the second side wall in the lateral direction. The plane portion of the second coupling portion faces the third side wall in the lateral direction. The second fastening portion and the fourth fastening portion are fixed to an inner wall surface of the casing extending in the lateral direction. The first fastening portion extends in the lateral direction without being bent at a coupled portion between the first fastening portion and a first end of the plane portion. The second fastening portion extends in the lateral direction without being bent at a coupled portion between the second fastening portion and a second end of the plane portion. The third fastening portion extends in the lateral direction without being bent from a coupled portion between the third fastening portion and a first end of the plane portion. The fourth fastening portion extends in the lateral direction without being bent from a coupled portion between the fourth fastening portion and a second end of the plane portion.

A vibration motor according to an embodiment of the present application can restrict its size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
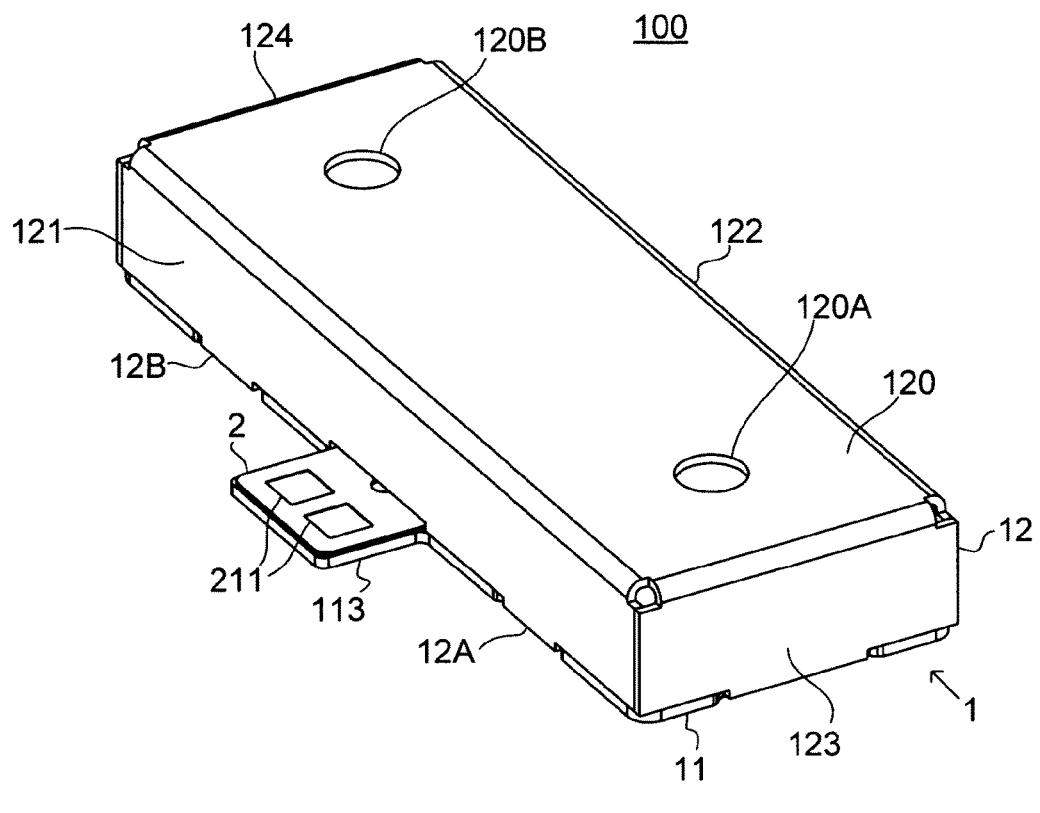
FIG. 1 is a top perspective view of the entirety of a vibration motor according to an embodiment.

Embodiments of the present invention are described below with reference to the drawings. Throughout the drawings, the lateral direction, in which a vibrating body vibrates, is denoted as an X direction. The longitudinal direction, which is perpendicular to the lateral direction, is denoted as a Y direction. The vertical direction, which is perpendicular to the lateral direction and the longitudinal direction, is denoted as a Z direction. For example, an upper part of FIG. 1 is an upper side in the vertical direction (Z direction). These directions defined here do not represent the positional relationship or directions when the vibration motor is installed in an actual device.

Figure 2:
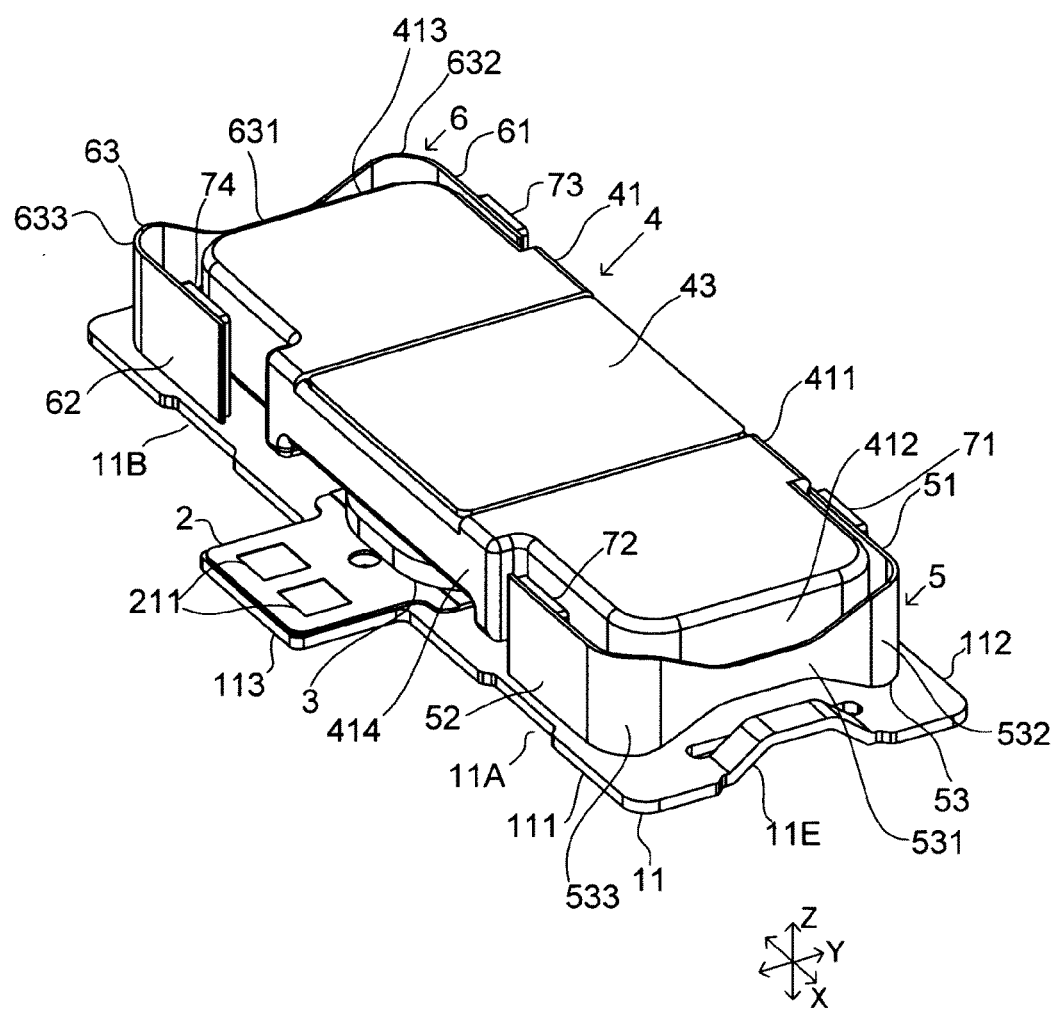
FIG. 2 is a perspective view of a vibration motor according to an embodiment from which a cover is removed.
Figure 3:
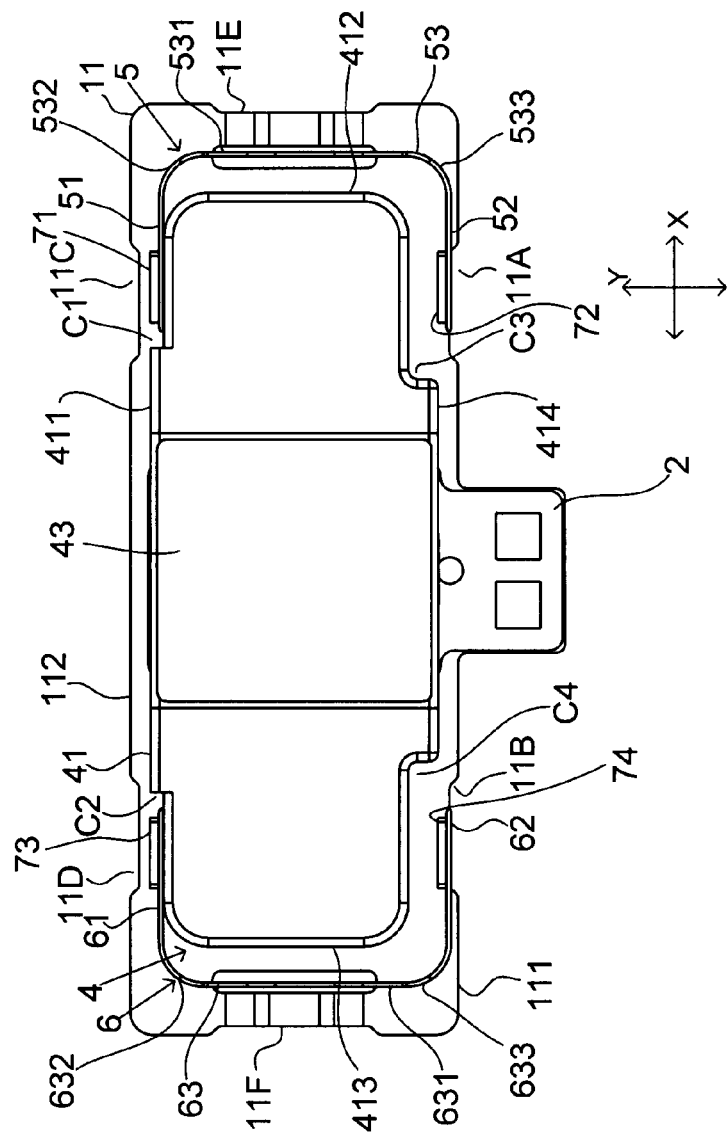
FIG. 3 is a top plan view of the vibration motor in the state illustrated in FIG. 2.
Figure 4:
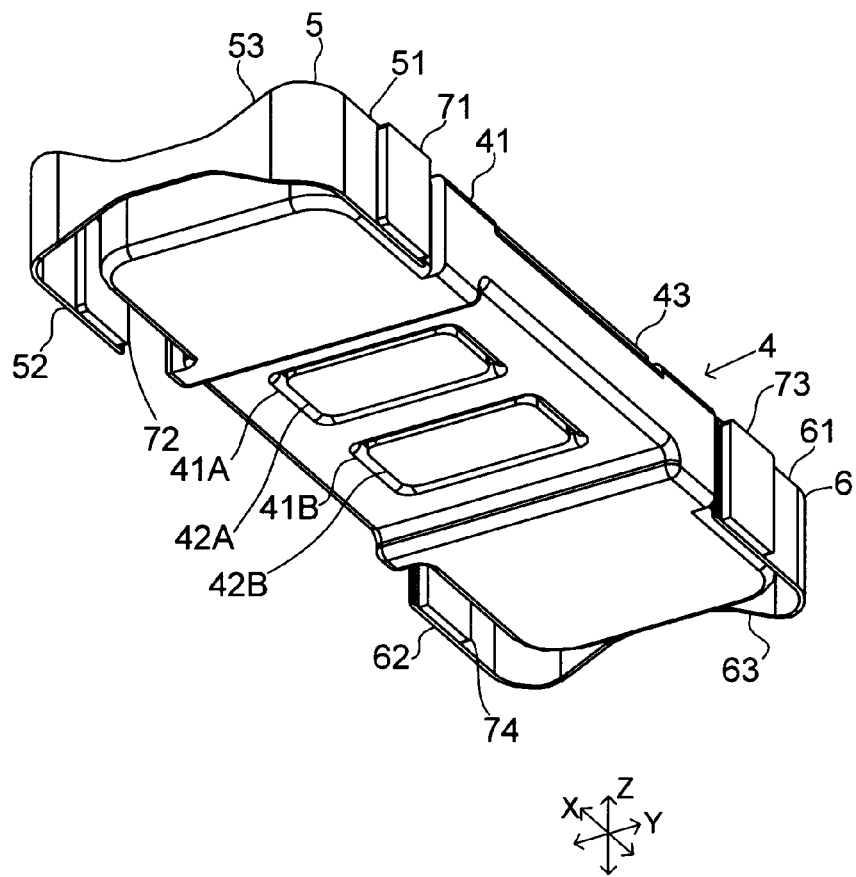
FIG. 4 is a bottom perspective view of an assembly including a vibrating body and an elastic member.

FIG. 1 is a top perspective view of the entirety of a vibration motor 100 according to an embodiment. FIG. 2 is a perspective view of the vibration motor 100 from which a cover 12 is removed. FIG. 3 is a top plan view of the vibration motor 100 in the state illustrated in FIG. 2. FIG. 4 is a bottom perspective view of an assembly including a vibrating body 4 and an elastic member.

The vibration motor 100 according to the present embodiment includes a casing 1, a substrate 2, a coil 3, a vibrating body 4, a first elastic member 5, and a second elastic member 6. The casing 1 includes a base 11, and a cover 12.

The cover 12 includes a top panel 120 and a first side portion 121 to a fourth side portion 124, which are connected to the top panel 120 and extend downward. The cover 12 is a substantially rectangular parallelepiped member having a portion facing the top panel 120 in the vertical direction open. The first side portion 121 and the second side portion 122 extend in the lateral direction and face each other in the longitudinal direction. The third side portion 123 and the fourth side portion 124 extend in the longitudinal direction and face each other in the lateral direction.

The substrate 2 is a flexible printed circuit (FPC). The substrate 2 may be a rigid substrate. The substrate 2 is fixed to an upper surface of the base 11, which is a plate member. The coil 3 is attached to the upper surface of the substrate 2. The coil 3 is bonded to the substrate 2 with, for example, an adhesive. The coil 3 may be fixed to the substrate 2 by a method other than bonding.

A stationary portion includes the casing 1, the substrate 2, and the coil 3. Specifically, the vibration motor 100 includes a stationary portion including the casing 1 and the coil 3.

The base 11 includes recesses 11A and 11B on a first side 111 extending in the lateral direction, and recesses 11C and 11D on a second side 112 opposite to the first side 111. The first side portion 121 of the cover 12 includes protrusions 12A and 12B, protruding downward. The second side portion 122 of the cover 12 includes two protrusions (not illustrated) protruding downward. The protrusions 12A and 12B are respectively fitted into the recesses 11A and 11B. The protrusions of the second side portion 122 are respectively fitted into the recesses 11C and 11D. This structure enables fixing of the position of the cover 12 on the base 11 in the longitudinal direction during manufacturing of the vibration motor 100.

The base 11 includes a first rising portion 11E and a second rising portion 11F. The first rising portion 11E and the second rising portion 11F are arranged in the lateral direction and formed by cutting and raising. The third side portion 123 of the cover 12 has its inner wall surface in contact with the first rising portion 11E. The fourth side portion 124 has its inner wall surface in contact with the second rising portion 11F. This structure enables fixing of the position of the cover 12 on the base 11 in the lateral direction during manufacturing of the vibration motor 100.

While the cover 12 is attached to the base 11, part of the substrate 2 protrudes outward in the longitudinal direction beyond the casing 1. This protruding portion is disposed on the upper surface of a protruding base 113 of the base 11, protruding in the longitudinal direction. The protruding base 113 protrudes from a middle portion of the first side 111. The protruding portion of the substrate 2 has two terminals 211. The terminals 211 enable an external device to feed current to the coil 3.

The vibrating body 4 includes a weight 41, a magnet 42A, a magnet 42B, and a top board 43. The weight 41 is made of, for example, a tungsten alloy. The weight 41 includes a first side wall 411 to a fourth side wall 414. The first side wall 411 extends in the lateral direction. The second side wall 412 extends in the longitudinal direction. The third side wall 413 extends in the longitudinal direction and faces the second side wall 412 in the lateral direction. The fourth side wall 414 extends in the lateral direction and faces the first side wall 411 in the longitudinal direction.

The weight 41 has hollow portions 41A and 41B, extending through the weight 41 in the vertical direction. The hollow portions 41A and 41B respectively hold magnets 42A and 42B. The magnets 42A and 42B are fixed to the weight 41 with, for example, an adhesive. The magnets 42A and 42B are located above the coil 3. The hollow portions 41A and 41B do not have to extend through the weight 41 in the vertical direction and may be recesses that can hold magnets 42A and 42B.

The top board 43 is fixed onto the upper surface of the weight 41. The top board 43 is fixed to the weight 41 by, for example, bonding with an adhesive. At least part of the top board 43 is made of a magnetic material and functions as a back yoke for the magnets 42A and 42B.

The first elastic member 5 is a flat spring. The first elastic member 5 includes a first fastening portion 51, a second fastening portion 52, and a first coupling portion 53. The first fastening portion 51 and the second fastening portion 52 are flat portions extending in the lateral direction. The first fastening portion 51 and the second fastening portion 52 face each other in the longitudinal direction. The first coupling portion 53 couples the first fastening portion 51 to the second fastening portion 52.

The second elastic member 6 is a flat spring. The second elastic member 6 includes a third fastening portion 61, a fourth fastening portion 62, and a second coupling portion 63. The third fastening portion 61 and the fourth fastening portion 62 are flat portions extending in the lateral direction. The third fastening portion 61 and the fourth fastening portion 62 face each other in the longitudinal direction. The second coupling portion 63 couples the third fastening portion 61 to the fourth fastening portion 62.

The first side wall 411 of the weight 41 includes a first recess C1 on one side in the lateral direction, and a second recess C2 on the other side in the lateral direction. The first fastening portion 51 is fixed to the first side wall 411 at the first recess C1. The third fastening portion 61 is fixed to the first side wall 411 at the second recess C2.

The first fastening portion 51 is fixed to the first side wall 411 by welding. A first reinforcing plate 71 is fixed to the surface of the first fastening portion 51 opposite to the first side wall 411 by welding. The first fastening portion 51 may be fixed to the first side wall 411 with an adhesive.

The second fastening portion 52 is fixed to the inner wall surface of the first side portion 121 of the cover 12 by welding. A second reinforcing plate 72 is fixed to a surface of the second fastening portion 52 opposite to the first side portion 121 by welding. The second fastening portion 52 may be fixed to the first side portion 121 with an adhesive.

A fourth side wall 414 of the weight 41 includes a third recess C3 on one side in the lateral direction, and a fourth recess C4 on the other side in the lateral direction. A fastened portion of the second fastening portion 52 faces the third recess C3 in the longitudinal direction.

The third fastening portion 61 is fixed to the first side wall 411 by welding. A third reinforcing plate 73 is fixed to a surface of the third fastening portion 61 opposite to the first side wall 411 by welding. The third fastening portion 61 may be fixed to the first side wall 411 with an adhesive.

The fourth fastening portion 62 is fixed to the inner wall surface of the first side portion 121 of the cover 12 by welding. A fourth reinforcing plate 74 is fixed to a surface of the fourth fastening portion 62 opposite to the first side portion 121 by welding. The fourth fastening portion 62 may be fixed to the first side portion 121 with an adhesive. A fastened portion of the fourth fastening portion 62 faces the fourth recess C4 in the longitudinal direction.

The first coupling portion 53 includes a plane portion 531. The plane portion 531 faces the second side wall 412 in the lateral direction. The plane portion 531 has its width in the vertical direction gradually decreasing from both ends in the longitudinal direction toward each other and becoming uniform in the middle. The first coupling portion 53 also includes a first curve 532, bent from the first end of the plane portion 531 to be oriented in the lateral direction, and a second curve 533, bent from the second end of the plane portion 531 to be oriented in the lateral direction. The first fastening portion 51 is coupled to the first curve 532 and extends in the lateral direction without being bent from the coupled portion. The second fastening portion 52 is coupled to the second curve 533 and extends in the lateral direction without being bent from the coupled portion.

The second coupling portion 63 includes a plane portion 631. The plane portion 631 faces the third side wall 413 in the lateral direction. The plane portion 631 has its width in the vertical direction gradually decreasing from both ends in the longitudinal direction toward each other and becoming uniform in the middle. The second coupling portion 63 also includes a third curve 632, bent from the first end of the plane portion 631 to be oriented in the lateral direction, and a fourth curve 633, bent from the second end of the plane portion 631 to be oriented in the lateral direction. The third fastening portion 61 is coupled to the third curve 632 and extends in the lateral direction without being bent from the coupled portion. The fourth fastening portion 62 is coupled to the fourth curve 633 and extends in the lateral direction without being bent from the coupled portion.

The vibrating body 4 is thus secured from the cover 12 by the first elastic member 5 and the second elastic member 6.

Figure 5:
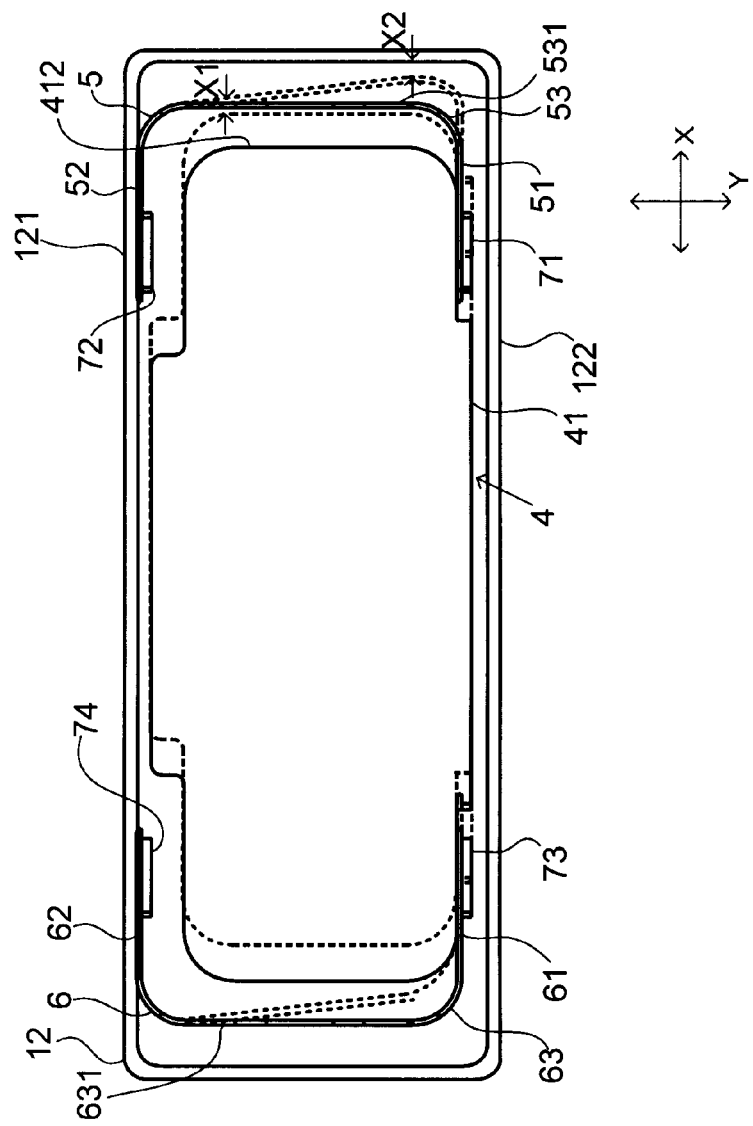
FIG. 5 is a bottom plan view of a cover.

FIG. 5 is a bottom plan view of the cover 12. Specifically, FIG. 5 is a view of the inside of the cover 12, viewed through the bottom opening. In FIG. 5, the illustration of the vibrating body 4 is simplified. FIG. 5 illustrates the vibrating body 4 and the elastic members 5 and 6 with solid lines, in the state where the coil 3 is not fed with current and the vibrating body 4 is free from a force exerted by the magnetic field. Specifically, the first elastic member 5 and the second elastic member 6, which are flat springs, are in a natural state, and the vibrating body 4 has zero displacement. In this state, the plane portion 531 of the first coupling portion 53 and the plane portion 631 of the second coupling portion 63 both extend in the longitudinal direction. In this state, the fastened portion of the first fastening portion 51 and the weight 41 faces the fastened portion of the second fastening portion 52 and the cover 12 in the longitudinal direction. The fastened portion of the third fastening portion 61 and the weight 41 faces the fastened portion of the fourth fastening portion 62 and the cover 12 in the longitudinal direction.

When current is fed to the coil 3 while the vibrating body 4 has zero displacement, the vibrating body 4 vibrates in the lateral direction with the interaction between the magnetic field caused by the coil 3 and the magnetic field caused by the magnets 42A and 42B. Broken lines in FIG. 5 represent the vibrating body 4 and the elastic members during vibrating, where the vibrating body 4 is displaced to one side in the lateral direction. The vibration motor 100 is designed so that the minimum gap X1 between the first coupling portion 53 and the second side wall 412 of the weight 41 and the minimum gap X2 between the first coupling portion 53 and the cover 12 are prevented from becoming zero when the broken lines in FIG. 5 represent the vibrating body 4 displaced to the maximum extent to one side in the lateral direction.

As described above, the vibration motor 100 according to the present embodiment includes the stationary portion including the casing 1 and the coil 3, the magnets 42A and 42B, and the weight 41. The vibration motor 100 also includes the vibrating body 4, supported while being allowed to vibrate in the lateral direction relative to the stationary portion, the plate-shaped first elastic member 5, and the plate-shaped second elastic member 6.

The first elastic member 5 includes the first fastening portion 51, the second fastening portion 52, and the first coupling portion 53. The second elastic member 6 includes the third fastening portion 61, the fourth fastening portion 62, and the second coupling portion 63. The first coupling portion 53 couples the first fastening portion 51 to the second fastening portion 52. The second coupling portion 63 couples the third fastening portion 61 to the fourth fastening portion 62.

The first fastening portion 51, the second fastening portion 52, the third fastening portion 61, and the fourth fastening portion 62 extend in the lateral direction. The first fastening portion 51 and the second fastening portion 52 face each other in the longitudinal direction, perpendicular to the lateral direction. The third fastening portion 61 and the fourth fastening portion 62 face each other in the longitudinal direction. The first coupling portion 53 and the second coupling portion 63 respectively include plane portions 531 and 631, extending in the longitudinal direction when the vibrating body 4 has zero displacement.

The weight 41 includes the first side wall 411, extending in the lateral direction, the second side wall 412, extending in the longitudinal direction, and the third side wall 413, extending in the longitudinal direction. The second side wall 412 and the third side wall 413 face each other in the lateral direction. The first fastening portion 51 is fixed to a portion of the first side wall 411 on one side in the lateral direction. The third fastening portion 61 is fixed to a portion of the first side wall 411 on the other side in the lateral direction. The plane portion 531 of the first coupling portion 53 faces the second side wall 412 in the lateral direction. The plane portion 631 of the second coupling portion 63 faces the third side wall 413 in the lateral direction. The second fastening portion 52 and the fourth fastening portion 62 are fixed to the inner wall surface of the casing 1 extending in the lateral direction (the inner wall surface of the cover 12).

The first coupling portion 53 also includes the first curve 532, bent from the first end of the plane portion 531 to be oriented in the lateral direction, and the second curve 533, bent from the second end of the plane portion 531 to be oriented in the lateral direction. The first fastening portion 51 extends in the lateral direction without being bent from the coupled portion between itself and the first curve 532. The second fastening portion 52 extends in the lateral direction without being bent from the coupled portion between itself and the second curve 533.

The second coupling portion 63 also includes the third curve 632, bent from the first end of the plane portion 631 to be oriented in the lateral direction, and the fourth curve 633, bent from the second end of the plane portion 631 to be oriented in the lateral direction. The third fastening portion 61 extends in the lateral direction without being bent from the coupled portion between itself and the third curve 632. The fourth fastening portion 62 extends in the lateral direction without being bent from coupled portion between itself and the fourth curve 633.

This structure dispenses with opening of each flat spring, otherwise required in an existing structure including V-shaped flat springs, and thus prevents the size increase of the vibration motor 100 in the lateral direction. The first coupling portion 53 and the second coupling portion 63 respectively include the plane portions 531 and 631 extending in the longitudinal direction when the vibrating body 4 has zero displacement, and thus prevent the size increase of the casing 1 in the lateral direction.

The above structure including the curves and the fastening portions prevents the vibrating body 4, while vibrating, from being displaced obliquely (diagonally in the plan view). This structure can thus prevent the size increase of the vibration motor 100 in the longitudinal direction.

When the vibrating body 4 has zero displacement, the fastened portion of the first fastening portion 51 faces the fastened portion of the second fastening portion 52 in the longitudinal direction, and the fastened portion of the third fastening portion 61 faces the fastened portion of the fourth fastening portion 62 in the longitudinal direction. This structure prevents the vibrating body 4, while vibrating, from being obliquely displaced (diagonally in a plan view). This structure can thus prevent the size increase of the vibration motor 100 in the longitudinal direction.

The present embodiment thus prevents the size increase of the vibration motor 100.

In the present embodiment, at least one of the first fastening portion 51 and the third fastening portion 61 is fixed to the first side wall 411 with a welding portion. This structure can thus enhance the fastening between the first elastic member 5 or the second elastic member 6 and the weight 41.

The reinforcing plates 71 and 73 are fastened to at least one of the first fastening portion 51 and the third fastening portion 61 with a welding portion. The reinforcing plates reinforce the strength at the fastened portion of the first fastening portion 51 or the third fastening portion 61. The reinforcing plates secure the thickness of the portion that is to be welded for facilitating welding.

At least one of the second fastening portion 52 and the fourth fastening portion 62 is fixed to the inner wall surface with a welding portion. This structure can thus enhance the fastening between the first elastic member 5 or the second elastic member 6 and the casing 1.

The reinforcing plates 72 and 74 are fixed to at least one of the second fastening portion 52 and the fourth fastening portion 62 with a welding portion. The reinforcing plates reinforce the strength at the fastened portion of the second fastening portion 52 or the fourth fastening portion 62. The reinforcing plates secure the thickness of the portion that is to be welded for facilitating welding.

Figure 6:
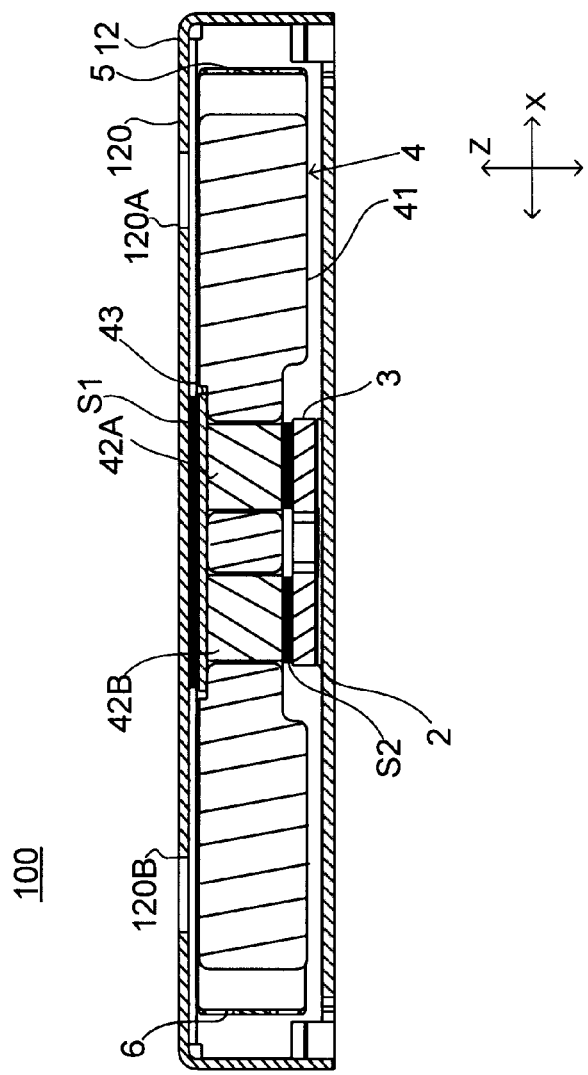
FIG. 6 is a sectional view of a vibration motor according to an embodiment, taken in a vertical direction at a middle position in the longitudinal direction and viewed from the side.

FIG. 6 is a sectional view of the vibration motor 100, taken in the vertical direction at a middle position in the longitudinal direction and viewed from the side. As illustrated in FIG. 6, a viscos magnetic fluid S1 is disposed in a gap between the upper surface of the top board 43 and the bottom surface of the top panel 120 of the cover 12. Specifically, the vibrating body 4 includes a top board 43, facing the magnets 42A and 42B in the vertical direction, and a magnetic fluid S1, in the gap between the top board 43 and the casing 1.

The magnetic fluid S1 thus functions as a damper when the vibrating body 4 vibrates. The magnetic fluid S1, with its magnetism, can stay on the magnetic top board 43 when the vibrating body 4 vibrates.

As illustrated in FIG. 6, a viscos magnetic fluid S2 is disposed in the gap between the upper surface of the coil 3 and the bottom surface of the vibrating body 4. Specifically, a magnetic fluid S2 is disposed in the gap between the coil 3 and the vibrating body 4.

Thus, the magnetic fluid S2 functions as a damper when the vibrating body 4 vibrates. The magnetic fluid S2, with its magnetism, can stay on the metal-made coil 3 when the vibrating body 4 vibrates. At least one of the magnetic fluids S1 and S2 may be included.

Now, processes of manufacturing the vibration motor 100 according to the present embodiment are described. Particularly, processes of manufacturing a structure where the vibrating body 4 is secured from the cover 12 by the elastic members are described.

Figure 7A:
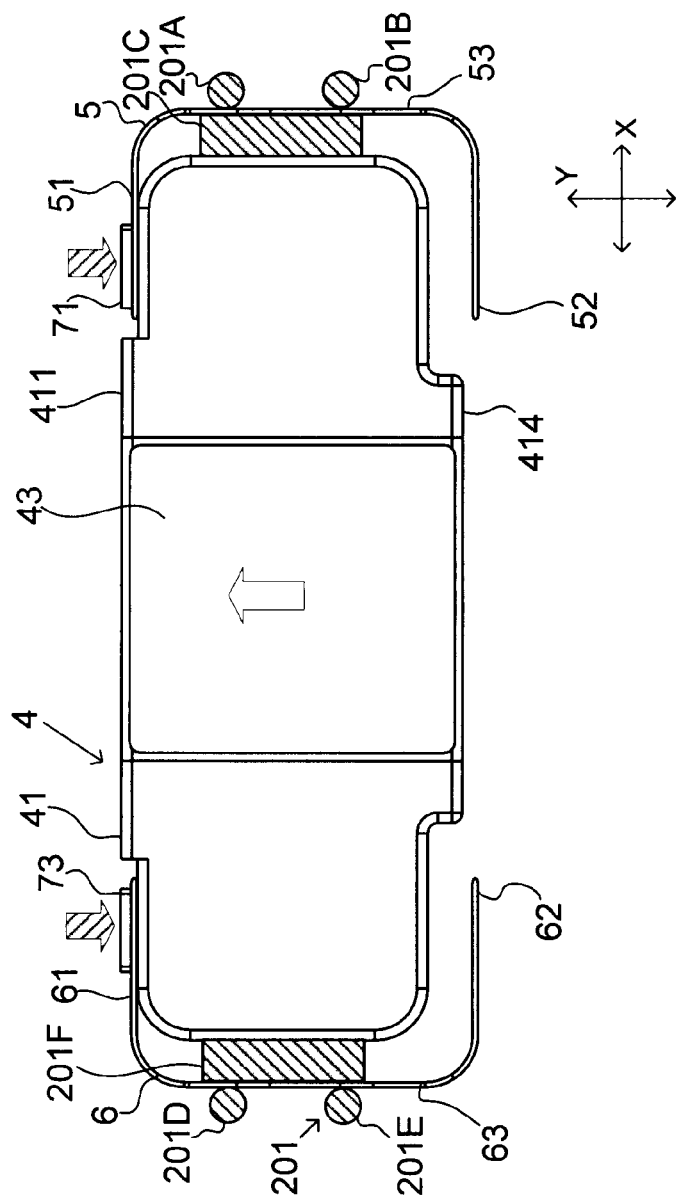
FIG. 7A is a top plan view illustrating the process of fixing elastic members to a vibrating body.
Figure 7:
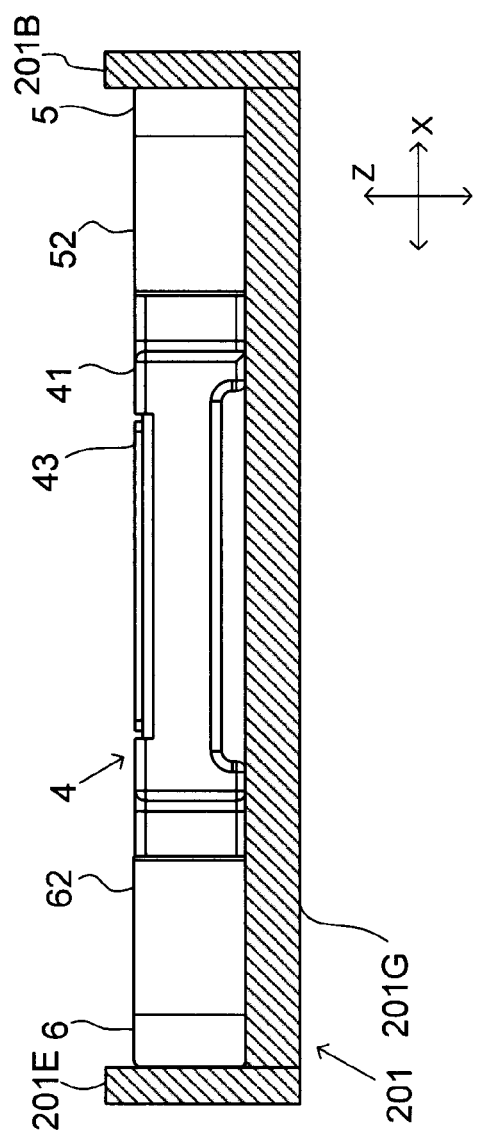
FIG. 7B is a side view when the process in FIG. 7A is viewed from a fourth side wall of a weight.

First, a process of fixing the elastic members to the vibrating body 4 is performed. FIG. 7A is a top plan view for illustrating the process of fixing elastic members to the vibrating body 4. FIG. 7B is a side view when the process in FIG. 7A is viewed from the fourth side wall 414 of the weight 41. As illustrated in FIGS. 7A and 7B, a jig 201 is used in this process.

The jig 201 includes columns 201A to 201F and a base table 201G, which form an integrated component. The columns 201A and 201B are cylindrical and extends upward from a laterally first end of the base table 201G. The column 201C has a rectangular parallelepiped shape. The column 201C faces the columns 201A and 201B in the lateral direction with a small gap interposed therebetween. The column 201C extends upward from the upper surface of the base table 201G. The columns 201D and 201E are cylindrical and extend upward from a laterally second end of the base table 201G. The column 201F has a rectangular parallelepiped shape. The column 201F faces the columns 201D and 201E in the lateral direction with a small gap interposed therebetween. The column 201F extends upward from the upper surface of the base table 201G.

The jig 201 having the above structure is prepared. Then, the first coupling portion 53 of the first elastic member 5 is held between the columns 201A and 201B and the column 201C, and the second coupling portion 63 of the second elastic member 6 is held between the columns 201D and 201E and the column 201F, so that the first elastic member 5 and the second elastic member 6 are held by the jig 201.

Then, the weight 41, the magnets 42A and 42B, and the top board 43 are assembled into the vibrating body 4, and the vibrating body 4 is disposed on the upper surface of the base table 201G. In this state, the weight 41 is interposed between the columns 201C and 201F in the lateral direction.

Then, a force is applied to the weight 41 in the longitudinal direction (in the direction indicated with a solid-white arrow in FIG. 7A) to press the first side wall 411 against the first fastening portion 51 and the third fastening portion 61. In this state, welding is performed using the first reinforcing plate 71 to fix the first fastening portion 51 to one side of the first side wall 411 in the lateral direction, and welding is performed using the third reinforcing plate 73 to fix the third fastening portion 61 to the other side of the first side wall 411 in the lateral direction. Welding is performed in directions denoted with hatched arrows in FIG. 7A.

In an existing structure including V-shaped flat springs, the flat springs need to be fixed at diagonal positions of the weight. Here, fixing the two flat springs to the weight at a time involves pressing the weight against the flat springs while applying a rotational force to the weight. In this case, the weight and the flat springs are more likely to be spaced with a gap. Fixing the flat springs to the weight with a gap interposed therebetween may change the vibration direction of the vibrating body from the intended lateral direction.

The method according to the present embodiment, on the other hand, can press the weight 41 against the two elastic members 5 and 6 with a force unidirectionally exerted on the weight 41 in the longitudinal direction. The method can thus easily fix the two elastic members at a time without forming a gap between the weight 41 and the elastic members. The method enables efficient and highly accurate manufacturing.

Figure 8A:
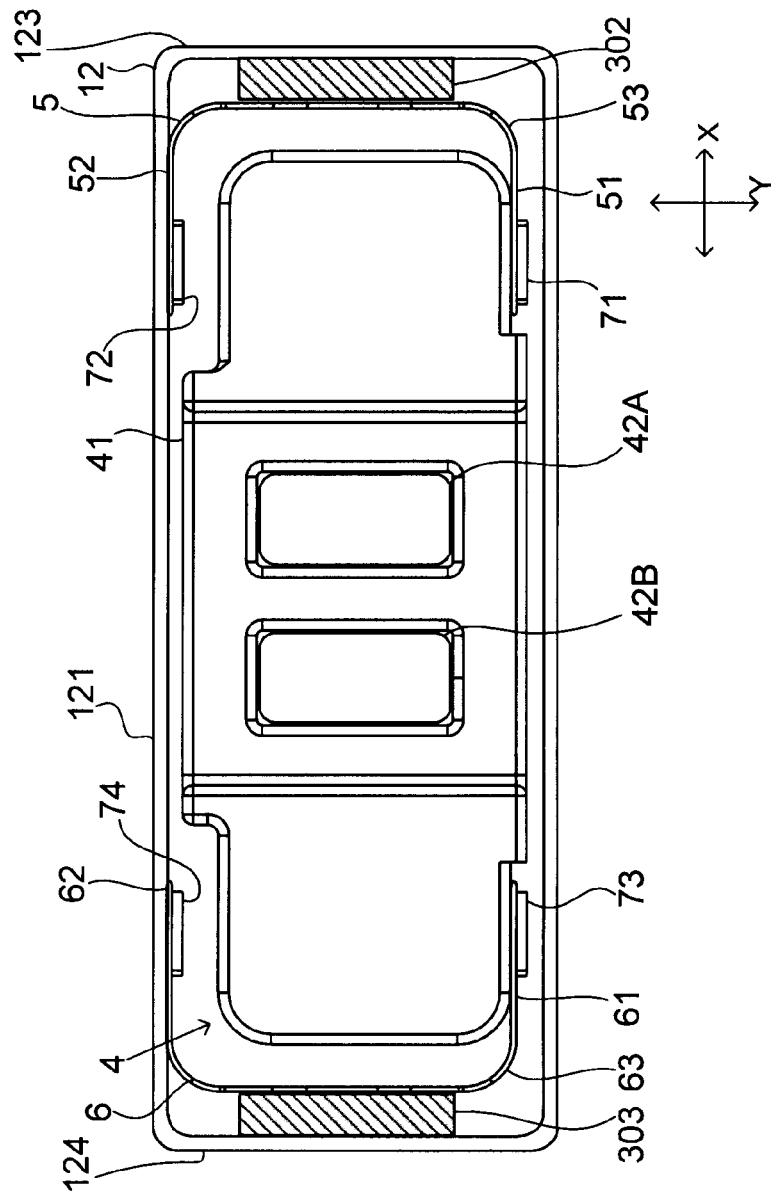
FIG. 8A is a top plan view illustrating the process of fixing a vibrating body, to which the elastic member is fixed, to a cover.
Figure 8:
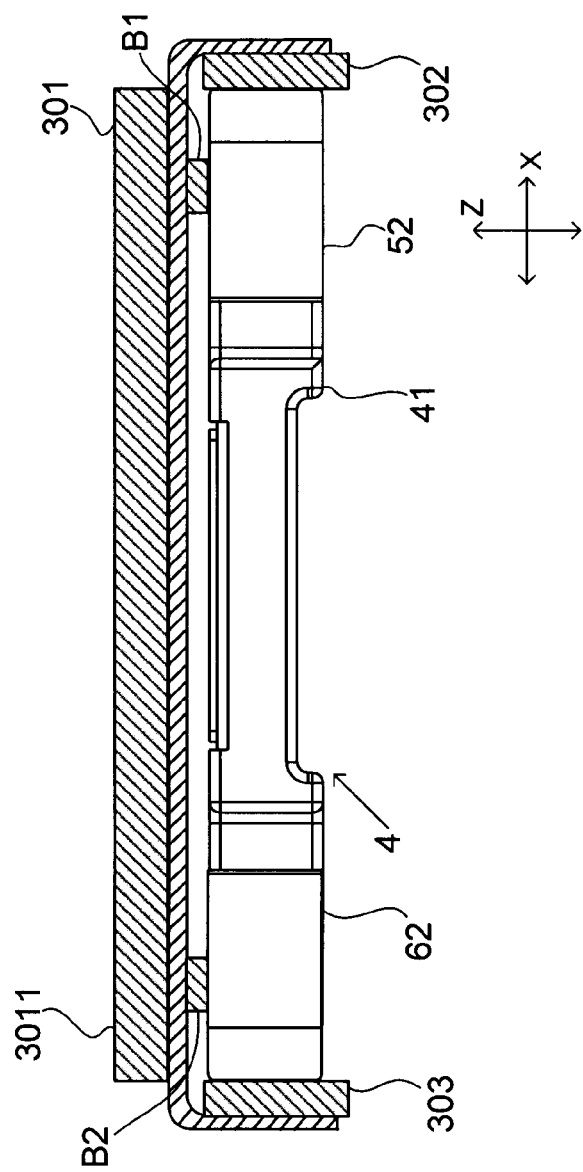
FIG. 8B is a sectional view of the process in FIG. 8A, viewed from the side.

Now, a process of fixing the vibrating body 4, to which the elastic members have been fixed, to the cover 12 is described. FIG. 8A is a top plan view for illustrating the process of fixing the vibrating body 4. FIG. 8B is a sectional view of the process in FIG. 8A, viewed from the side. As illustrated in FIGS. 8A and 8B, jigs 301 to 303 are used in this process. In FIG. 8B, the jig 301 is located on the upper side, but the jig 301 is located on the lower side in the gravitational direction in the actual process.

The jig 301 includes a base table 3011 and bosses B1 and B2. The bosses B1 and B2 protrude from the upper surface of the base table 3011 and are arranged in the lateral direction. The cover 12 is disposed on the base table 3011 with the bosses B1 and B2 inserted through holes 120A and 120B (FIG. 1) in the top panel 120 of the cover 12. The vibrating body 4 is then disposed on the bosses B1 and B2. Thus, the vibrating body 4 is fixed in position in the vertical direction.

The jig 302 having a rectangular parallelepiped shape is held between the first coupling portion 53 and the third side portion 123, and concurrently, the jig 303 having a rectangular parallelepiped shape is held between the second coupling portion 63 and the fourth side portion 124. Thus, the structure including the vibrating body 4 and the elastic members 5 and 6 is fixed in position in the lateral direction.

After this position fixing, the second fastening portion 52 and the fourth fastening portion 62 are pressed against the inner wall surface of the first side portion 121 of the cover 12. In this state, the second fastening portion 52 is welded using the second reinforcing plate 72 to be fixed to the inner wall surface, and the fourth fastening portion 62 is welded using the third reinforcing plate 74 to be fixed to the inner wall surface.

The structure of the above jigs is a mere example, and may be appropriately changed. The two elastic members do not necessarily need to be fixed to the weight at a time.

Figure 9:
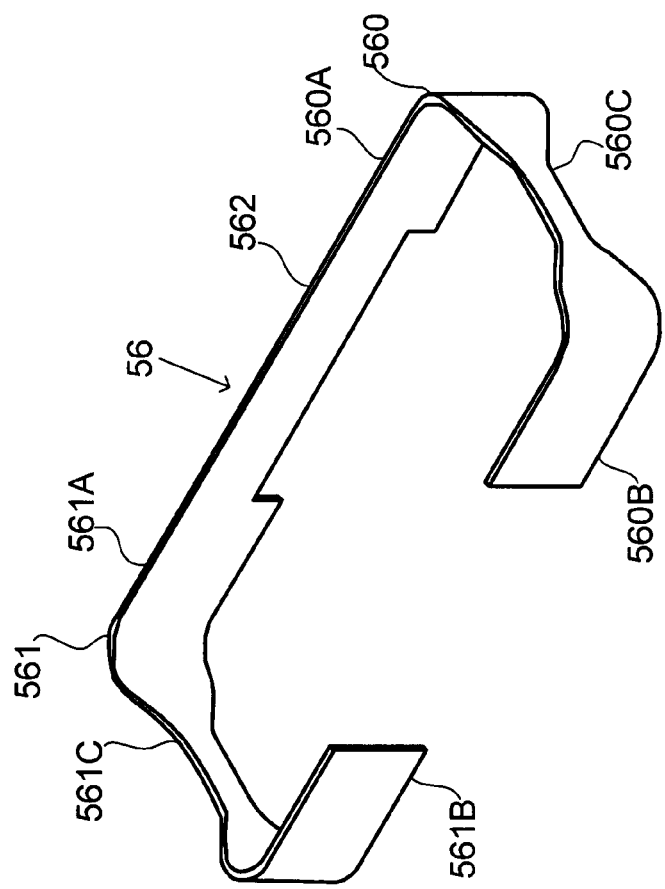
FIG. 9 is a perspective view of an elastic member according to a modification example.

Instead of using the above first elastic member 5 and second elastic member 6, an elastic member 56 illustrated in FIG. 9 may be used as an example of an elastic member. FIG. 9 is a perspective view of the elastic member 56 according to a modification example. Specifically, the present modification example includes a single elastic member instead of two elastic members.

The elastic member 56 is a flat spring. The elastic member 56 includes a first elastic member 560, disposed on a first side in the lateral direction, a second elastic member 561, disposed on a second side in the lateral direction, and an elastic-member coupler 562, which couples the first elastic member 560 to the second elastic member 561.

The first elastic member 560 corresponds to the above-described first elastic member 5, and includes a first fastening portion 560A, a second fastening portion 560B, and a first coupling portion 560C. The first fastening portion 560A is fixed to a first side of the weight in the lateral direction. The second fastening portion 560B is fixed to the inner wall surface of the cover.

The second elastic member 561 corresponds to the above-described second elastic member 6, and includes a third fastening portion 561A, a fourth fastening portion 561B, and a second coupling portion 561C. The third fastening portion 561A is fixed to a second side of the weight in the lateral direction. The fourth fastening portion 561B is fixed to the inner wall surface of the cover.

The elastic-member coupler 562 couples the first fastening portion 560A to the third fastening portion 561A in the lateral direction. Specifically, the first elastic member 560 and the second elastic member 561 are coupled to each other by the elastic-member coupler 562 extending in the lateral direction.

In this structure, the first elastic member 560, the second elastic member 561, and the elastic-member coupler 562 form an integrated component. This structure facilitates fixing of the positions of the first elastic member 560 and the second elastic member 561 when fixing the weight on the first elastic member 560 and the second elastic member 561.

Figure 10:
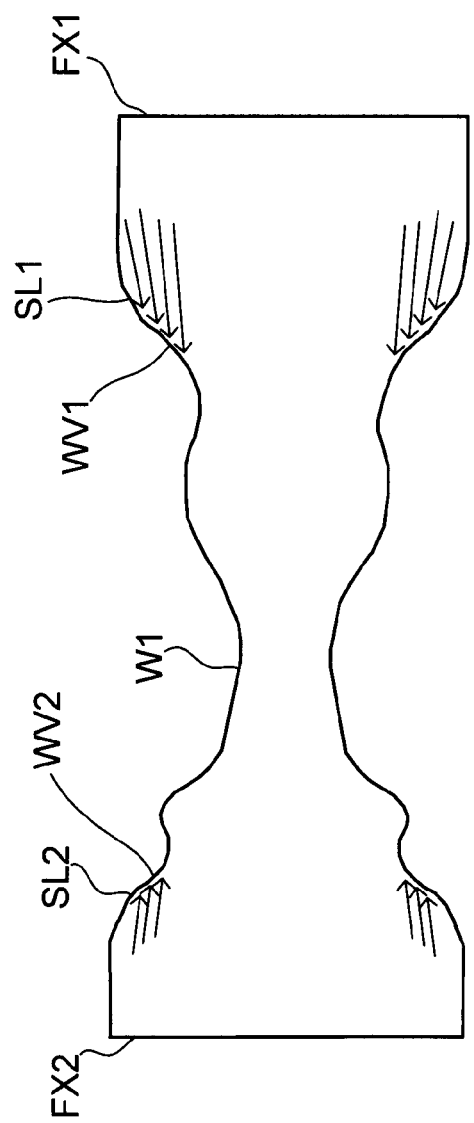
FIG. 10 is a side view of a first coupling portion of an elastic member according to a modification example.

The first coupling portion 53 of the above first elastic member 5 or the first coupling portion 560C of the above first elastic member 560 may have a shape of a modification example illustrated in FIG. 10. FIG. 10 is a side view of the first coupling portion according to a modification example.

The first coupling portion illustrated in FIG. 10 includes a first narrow portion W1, a first slope SL1, and a second slope SL2. The first narrow portion W1 has a smaller width in the vertical direction than a first fastening portion FX1 (for example, first fastening portion 51) and a second fastening portion FX2 (for example, second fastening portion 52). The first slope SL1 has its width in the vertical direction gradually increasing from the first narrow portion W1 toward the first fastening portion FX1. The second slope SL2 has its width in the vertical direction gradually increasing from the first narrow portion W1 toward the second fastening portion FX2.

The first slope SL1 and the second slope SL2 respectively include width varying portions WV1 and WV2, which have their width in the vertical direction gradually decreasing toward the first narrow portion W1 and then increasing. Here, at least one of the first slope SL1 and the second slope SL2 may have a width varying portion.

Such width varying portions prevent the first fastening portion FX1 and the second fastening portion FX2 susceptible to the stress from being broken by the stress, because the stress on the first fastening portion FX1 and the second fastening portion FX2 can be dispersed to the width varying portions. The arrows illustrated in FIG. 10 denote stress dispersion. The width varying portion has the same effect if it has its width in the vertical direction gradually decreasing toward the first narrow portion W1 and then becoming uniform.

The second coupling portion (for example, the second coupling portion 63 of the second elastic member 6) may have the same shape as the first coupling portion. Specifically, the second coupling portion may include a second narrow portion, having a smaller width in the vertical direction than the third fastening portion and the fourth fastening portion, a third slope, having its width in the vertical direction gradually increasing from the second narrow portion to the third fastening portion, and a fourth slope, having its width in the vertical direction gradually increasing from the second narrow portion to the fourth fastening portion. In this structure, at least one of the third slope and the fourth slope includes a width varying portion that has its width in the vertical direction gradually decreasing toward the second narrow portion and then increasing or becoming uniform.

In this structure, the stress on the third fastening portion and the fourth fastening portion can be dispersed to the width varying portion, and the third fastening portion and the fourth fastening portion can be prevented from being broken.

The above-described first elastic member 5 may exclude the first curve 532 and the second curve 533, and have the first fastening portion 51 directly connected to the first end of the plane portion 531 and the second fastening portion 52 directly connected to the second end of the plane portion 531. Specifically, the first fastening portion 51 or the second fastening portion 52 and the plane portion 531 form an angle of 90 degrees when the vibrating body 4 has zero displacement. Similarly, the above-described second elastic member 6 may exclude the third curve 632 and the fourth curve 633, and have the third fastening portion 61 directly connected to the first end of the plane portion 631 and the fourth fastening portion 62 directly connected to the second end of the plane portion 631. Specifically, the third fastening portion 61 or the fourth fastening portion 62 and the plane portion 631 form an angle of 90 degrees when the vibrating body 4 has zero displacement.

Specifically, the first fastening portion 51 may extend in the lateral direction without being bent from the coupled portion between itself and the first end of the plane portion 531, and the second fastening portion 52 may extend in the lateral direction without being bent from the coupled portion between itself and the second end of the plane portion 531. Similarly, the third fastening portion 61 may extend in the lateral direction without being bent from the coupled portion between itself and the first end of the plane portion 631, and the fourth fastening portion 62 may extend in the lateral direction without being bent from the coupled portion between itself and the second end of the plane portion 631.

Some embodiments of the present invention have been described thus far. The embodiments can be modified in various manners within the scope not departing from the gist of the present invention.

The present invention may be applicable to a vibration motor included in, for example, a smartphone or a game pad.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration motor, comprising:
a stationary portion, which includes a casing and a coil;
a vibrating body, which includes a magnet and a weight and is supported to be capable of vibrating in a lateral direction relative to the stationary portion;
a first elastic member having a plate shape; and
a second elastic member having a plate shape,
wherein the first elastic member includes a first fastening portion, a second fastening portion, and a first coupling portion,
wherein the second elastic member includes a third fastening portion, a fourth fastening portion, and a second coupling portion,
wherein the first coupling portion couples the first fastening portion to the second fastening portion,
wherein the second coupling portion couples the third fastening portion to the fourth fastening portion,
wherein the first fastening portion, the second fastening portion, the third fastening portion, and the fourth fastening portion extend in the lateral direction,
wherein the first fastening portion and the second fastening portion face each other in a longitudinal direction perpendicular to the lateral direction,
wherein the third fastening portion and the fourth fastening portion face each other in the longitudinal direction,
wherein the first coupling portion and the second coupling portion each include a plane portion extending in the longitudinal direction when the vibrating body has zero displacement,
wherein the weight includes
a first side wall extending in the lateral direction,
a second side wall extending in the longitudinal direction, and
a third side wall extending in the longitudinal direction,
wherein the second side wall and the third side wall face each other in the lateral direction;
wherein the first fastening portion is fixed to a first side of the first side wall in the lateral direction,
wherein the third fastening portion is fixed to a second side of the first side wall in the lateral direction,
wherein the plane portion of the first coupling portion faces the second side wall in the lateral direction,
wherein the plane portion of the second coupling portion faces the third side wall in the lateral direction,
wherein the second fastening portion and the fourth fastening portion are fixed to an inner wall surface of the casing extending in the lateral direction,
wherein the first coupling portion further includes a first curve, which is bent to be oriented in the lateral direction from a first end of the plane portion of the first coupling portion, and a second curve, which is bent to be oriented in the lateral direction from a second end of the plane portion of the first coupling portion,
wherein the first fastening portion extends in the lateral direction without being bent at a coupled portion between the first fastening portion and the first curve,
wherein the second fastening portion extends in the lateral direction without being bent at a coupled portion between the second fastening portion and the second curve,
wherein the second coupling portion further includes a third curve, which is bent to be oriented in the lateral direction from the first end of the plane portion of the second coupling portion, and a fourth curve, which is bent to be oriented in the lateral direction from the second end of the plane portion of the second coupling portion,
wherein the third fastening portion extends in the lateral direction without being bent from a coupled portion between the third fastening portion and the third curve, and
wherein the fourth fastening portion extends in the lateral direction without being bent from a coupled portion between the fourth fastening portion and the fourth curve.

2. The vibration motor according to claim 1,
wherein, when the vibrating body has zero displacement, a fastened portion of the first fastening portion and a fastened portion of the second fastening portion face each other in the longitudinal direction, and
wherein, when the vibrating body has zero displacement, a fastened portion of the third fastening portion and a fastened portion of the fourth fastening portion face each other in the longitudinal direction.

3. The vibration motor according to claim 1,
wherein the first elastic member and the second elastic member are coupled to each other by an elastic-member coupler extending in the lateral direction.

4. The vibration motor according to claim 1,
wherein at least one of the first fastening portion and the third fastening portion is fixed to the first side wall using a welding portion.

5. The vibration motor according to claim 4,
wherein a reinforcing plate is fixed to at least one of the first fastening portion and the third fastening portion using the welding portion.

6. The vibration motor according to claim 1,
wherein at least one of the second fastening portion and the fourth fastening portion is fixed to the inner wall surface using a welding portion.

7. The vibration motor according to claim 6,
wherein a reinforcing plate is fixed to at least one of the second fastening portion and the fourth fastening portion using the welding portion.

8. The vibration motor according to claim 1,
wherein the first coupling portion includes
- a first narrow portion having a smaller width in a vertical direction, perpendicular to the lateral direction and the longitudinal direction, than the first fastening portion and the second fastening portion,
- a first slope having a width in the vertical direction gradually increasing from the first narrow portion toward the first fastening portion, and
- a second slope having a width in the vertical direction gradually increasing from the first narrow portion toward the second fastening portion, wherein at least one of the first slope and the second slope has a width varying portion that has a width in the vertical direction gradually decreasing toward the first narrow portion and then increasing or becoming uniform.

9. The vibration motor according to claim 1,
wherein the second coupling portion includes
- a second narrow portion having a smaller width in a vertical direction, perpendicular to the lateral direction and the longitudinal direction, than the third fastening portion and the fourth fastening portion,
- a third slope having a width in the vertical direction gradually increasing from the second narrow portion toward the third fastening portion, and
- a fourth slope having a width in the vertical direction gradually increasing from the second narrow portion toward the fourth fastening portion, wherein at least one of the third slope and the fourth slope has a width varying portion that has a width in the vertical direction gradually decreasing toward the second narrow portion and then increasing or becoming uniform.

10. The vibration motor according to claim 1,
wherein the vibrating body includes a top board facing the magnet in a vertical direction, perpendicular to the lateral direction and the longitudinal direction, and
wherein a magnetic fluid is disposed in a gap between the top board and the casing.

11. The vibration motor according to claim 1,
wherein a magnetic fluid is disposed in a gap between the coil and the vibrating body.

12. A vibration motor, comprising:
a stationary portion, which includes a casing and a coil;
a vibrating body, which includes a magnet and a weight and is supported to be capable of vibrating in a lateral direction relative to the stationary portion;
a first elastic member having a plate shape; and
a second elastic member having a plate shape,
wherein the first elastic member includes a first fastening portion, a second fastening portion, and a first coupling portion,
wherein the second elastic member includes a third fastening portion, a fourth fastening portion, and a second coupling portion,
wherein the first coupling portion couples the first fastening portion to the second fastening portion,
wherein the second coupling portion couples the third fastening portion to the fourth fastening portion,
wherein the first fastening portion, the second fastening portion, the third fastening portion, and the fourth fastening portion extend in the lateral direction,
wherein the first fastening portion and the second fastening portion face each other in a longitudinal direction perpendicular to the lateral direction,
wherein the third fastening portion and the fourth fastening portion face each other in the longitudinal direction,
wherein the first coupling portion and the second coupling portion each include a plane portion extending in the longitudinal direction when the vibrating body has zero displacement,
wherein the weight includes
- a first side wall extending in the lateral direction,
- a second side wall extending in the longitudinal direction, and
- a third side wall extending in the longitudinal direction, wherein the second side wall and the third side wall face each other in the lateral direction;
wherein the first fastening portion is fixed to a first side of the first side wall in the lateral direction,
wherein the third fastening portion is fixed to a second side of the first side wall in the lateral direction,
wherein the plane portion of the first coupling portion faces the second side wall in the lateral direction,
wherein the plane portion of the second coupling portion faces the third side wall in the lateral direction,
wherein the second fastening portion and the fourth fastening portion are fixed to an inner wall surface of the casing extending in the lateral direction,
wherein the first fastening portion extends in the lateral direction without being bent at a coupled portion between the first fastening portion and a first end of the plane portion of the first coupling portion,
wherein the second fastening portion extends in the lateral direction without being bent at a coupled portion between the second fastening portion and a second end of the plane portion of the first coupling portion,
wherein the third fastening portion extends in the lateral direction without being bent from a coupled portion between the third fastening portion and a first end of the plane portion of the second coupling portion, and
wherein the fourth fastening portion extends in the lateral direction without being bent from a coupled portion between the fourth fastening portion and a second end of the plane portion of the second coupling portion.

13. The vibration motor according to claim 12,
wherein, when the vibrating body has zero displacement, a fastened portion of the first fastening portion and a fastened portion of the second fastening portion face each other in the longitudinal direction, and wherein, when the vibrating body has zero displacement, a fastened portion of the third fastening portion and a fastened portion of the fourth fastening portion face each other in the longitudinal direction.

14. The vibration motor according to claim 12, wherein the first elastic member and the second elastic member are coupled to each other by an elastic-member coupler extending in the lateral direction.

15. The vibration motor according to claim 12, wherein at least one of the first fastening portion and the third fastening portion is fixed to the first side wall using a welding portion.

16. The vibration motor according to claim 15, wherein a reinforcing plate is fixed to at least one of the first fastening portion and the third fastening portion using the welding portion.

17. The vibration motor according to claim 12, wherein at least one of the second fastening portion and the fourth fastening portion is fixed to the inner wall surface using a welding portion.

18. The vibration motor according to claim 17, wherein a reinforcing plate is fixed to at least one of the second fastening portion and the fourth fastening portion using the welding portion.

19. The vibration motor according to claim 12, wherein the first coupling portion includes
a first narrow portion having a smaller width in a vertical direction, perpendicular to the lateral direction and the longitudinal direction, than the first fastening portion and the second fastening portion,
a first slope having a width in the vertical direction gradually increasing from the first narrow portion toward the first fastening portion, and
a second slope having a width in the vertical direction gradually increasing from the first narrow portion toward the second fastening portion,
wherein at least one of the first slope and the second slope has a width varying portion that has a width in the vertical direction gradually decreasing toward the first narrow portion and then increasing or becoming uniform.

20. The vibration motor according to claim 12, wherein the second coupling portion includes
a second narrow portion having a smaller width in a vertical direction, perpendicular to the lateral direction and the longitudinal direction, than the third fastening portion and the fourth fastening portion,
a third slope having a width in the vertical direction gradually increasing from the second narrow portion toward the third fastening portion, and
a fourth slope having a width in the vertical direction gradually increasing from the second narrow portion toward the fourth fastening portion,
wherein at least one of the third slope and the fourth slope has a width varying portion that has a width in the vertical direction gradually decreasing toward the second narrow portion and then increasing or becoming uniform.

21. The vibration motor according to claim 12, wherein the vibrating body includes a top board facing the magnet in a vertical direction, perpendicular to the lateral direction and the longitudinal direction, and
wherein a magnetic fluid is disposed in a gap between the top board and the casing.

22. The vibration motor according to claim 12, wherein a magnetic fluid is disposed in a gap between the coil and the vibrating body.

\* \* \* \* \*